Jan. 12, 1971 E. H. BENTLEY 3,553,786
INJECTION MOULDING MACHINE
Filed June 5, 1967 8 Sheets-Sheet 1

INVENTOR
ERIC HERBERT BENTLEY
By: Norris & Bateman, Attys

Jan. 12, 1971 E. H. BENTLEY 3,553,786
INJECTION MOULDING MACHINE
Filed June 5, 1967 8 Sheets-Sheet 6

INVENTOR
ERIC HERBERT BENTLEY
By Norris + Bateman, Attys.

Jan. 12, 1971  E. H. BENTLEY  3,553,786
INJECTION MOULDING MACHINE
Filed June 5, 1967  8 Sheets-Sheet 8

INVENTOR
ERIC HERBERT BENTLEY
By Norris & Bateman, Atty

United States Patent Office 3,553,786
Patented Jan. 12, 1971

3,553,786
INJECTION MOULDING MACHINE

Eric Herbert Bentley, Bradford-on-Avon, England, assignor to C.I.C. Engineering Limited, Somerset, England
Filed June 5, 1967, Ser. No. 643,462
Claims priority, application Great Britain, June 9, 1966, 25,698/66
Int. Cl. B29f 1/00
U.S. Cl. 18—30          10 Claims

ABSTRACT OF THE DISCLOSURE

The disclosure is concerned with an injection moulding machine for use in the manufacture of footwear and comprises a single mould station having means for supporting and actuating movable co-acting mould components, a power driven injection device arranged so that the co-acting mould components close thereon when moving to their closed positions and coupling means associated with at least one of the mould component supporting means; the whole assembly being disposed within a casing provided with manually operated means for initiating an automatic cycle of mould operations.

---

This invention relates to injection moulding machines for use in the manufacture of footwear and has as its primary object the provision of a relatively simple machine capable of effecting a rapid cycle of operations with efficient utilisation of moulds.

Machines for the manufacture of fully-moulded footwear and/or the direct moulding of soles and heels onto prepared shoe uppers have hitherto comprised relatively large extruder/injector devices arranged to operate with a plurality of moulds presented singly and sequentially to the injector nozzle. Such machines generally include a conveyor or turn-table adapted to support the moulds and the mould-operating mechanisms and in consequence are of a relatively large size. For economic operation, maximum use of the mould stations, generally 10 or 12 in number, has proved essential, such a number of moulds also being necessary to permit adequate gelling or cooling of the injected material before its removal from the mould and the re-presentation of the emptied mould to the injector nozzle.

It is a more specific object of the present invention to provide a simplified form of machine for the moulding of soles and heels of plastics or like materials either as units or directly onto lasted shoe uppers, which machine avoids the complications of multiple moulds and associated conveyor or turn-table structures and yet at the same time makes possible rapid gelling of the moulded units and their removal from the machine whereby a substantial rate of production can be maintained.

According to the invention a machine for injection moulding footwear or parts thereof comprises a single mould station including means for supporting and actuating movable co-acting mould components, an injection device provided with a delivery trunk or nozzle extending therefrom and so positioned that the co-acting mould components colse thereon when moving to the "mould closed" position whilst permitting the said trunk or nozzle to communicate with the mould cavity to deliver plastics material thereto, and cooling means associated with at least one of the means which support the movable mould components.

Reference will now be made to the accompanying drawings which illustrate by way of example a machine constructed according to the invention and in which.

Figure 1:
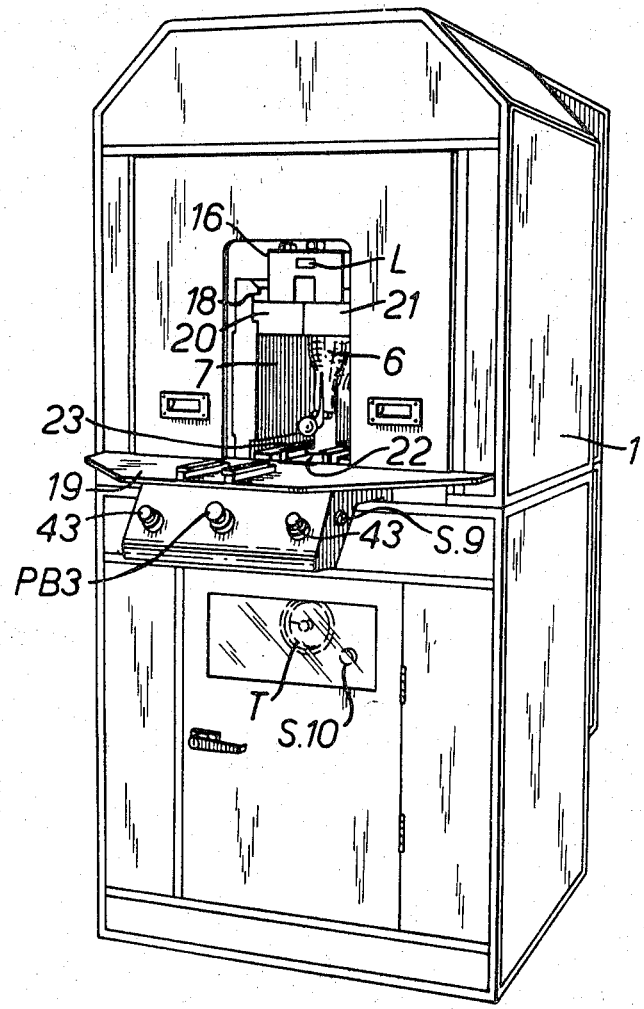
FIG. 1 is a perspective view of the exterior of an injection moulding machine.
Figure 2:
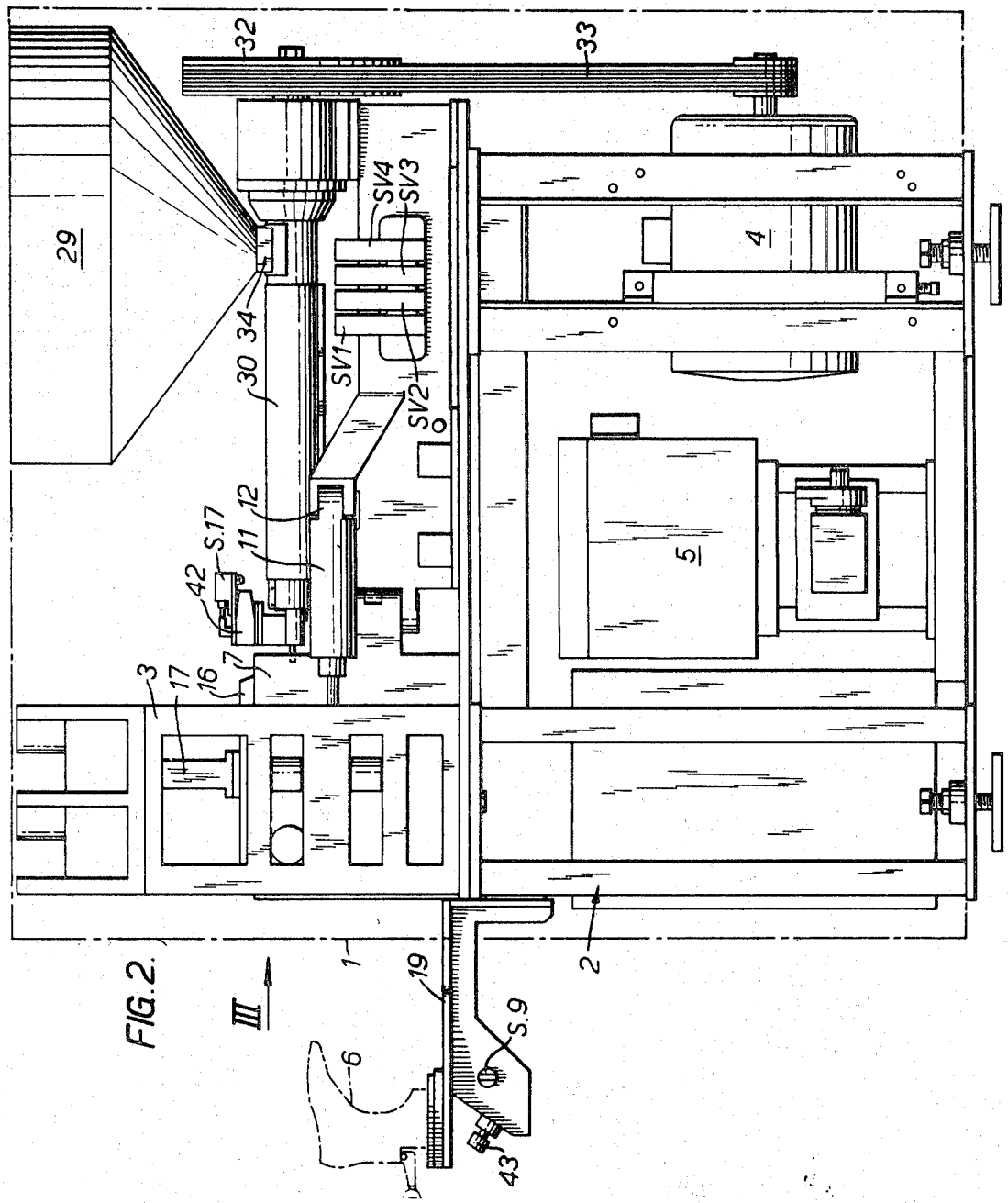
FIG. 2 is a side elevation of the interior of the machine shown in FIG. 1.
Figure 3:
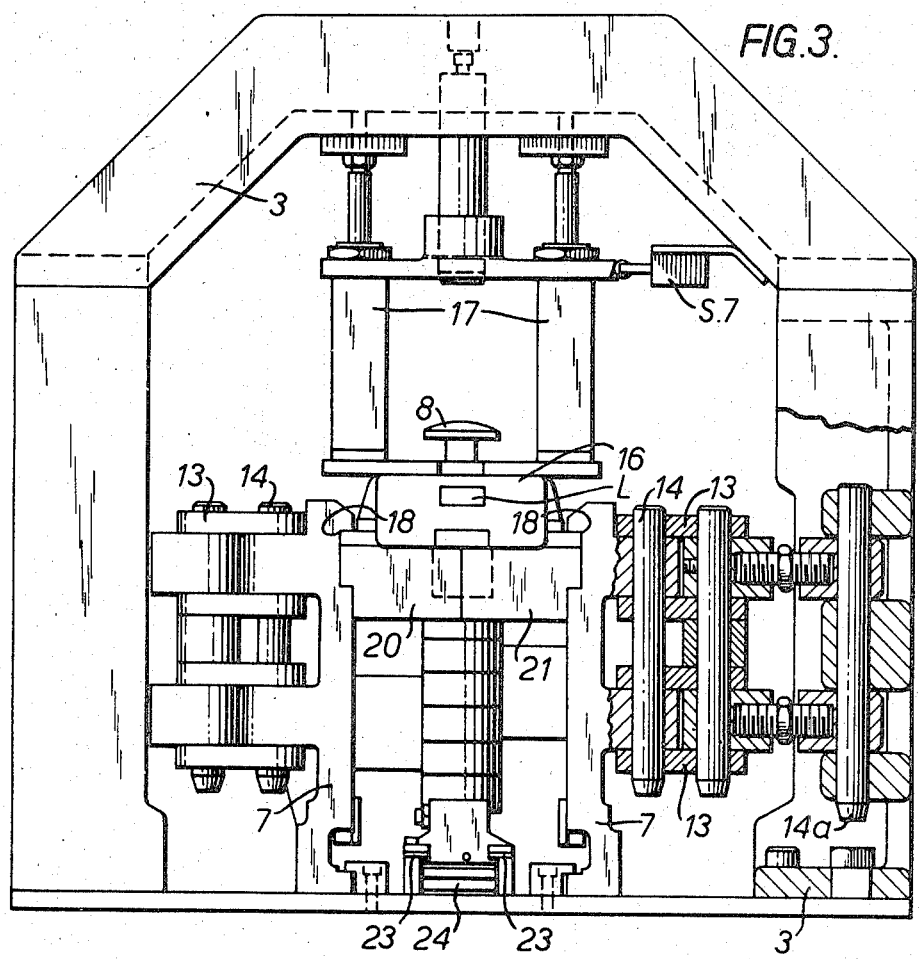
Figure 4:
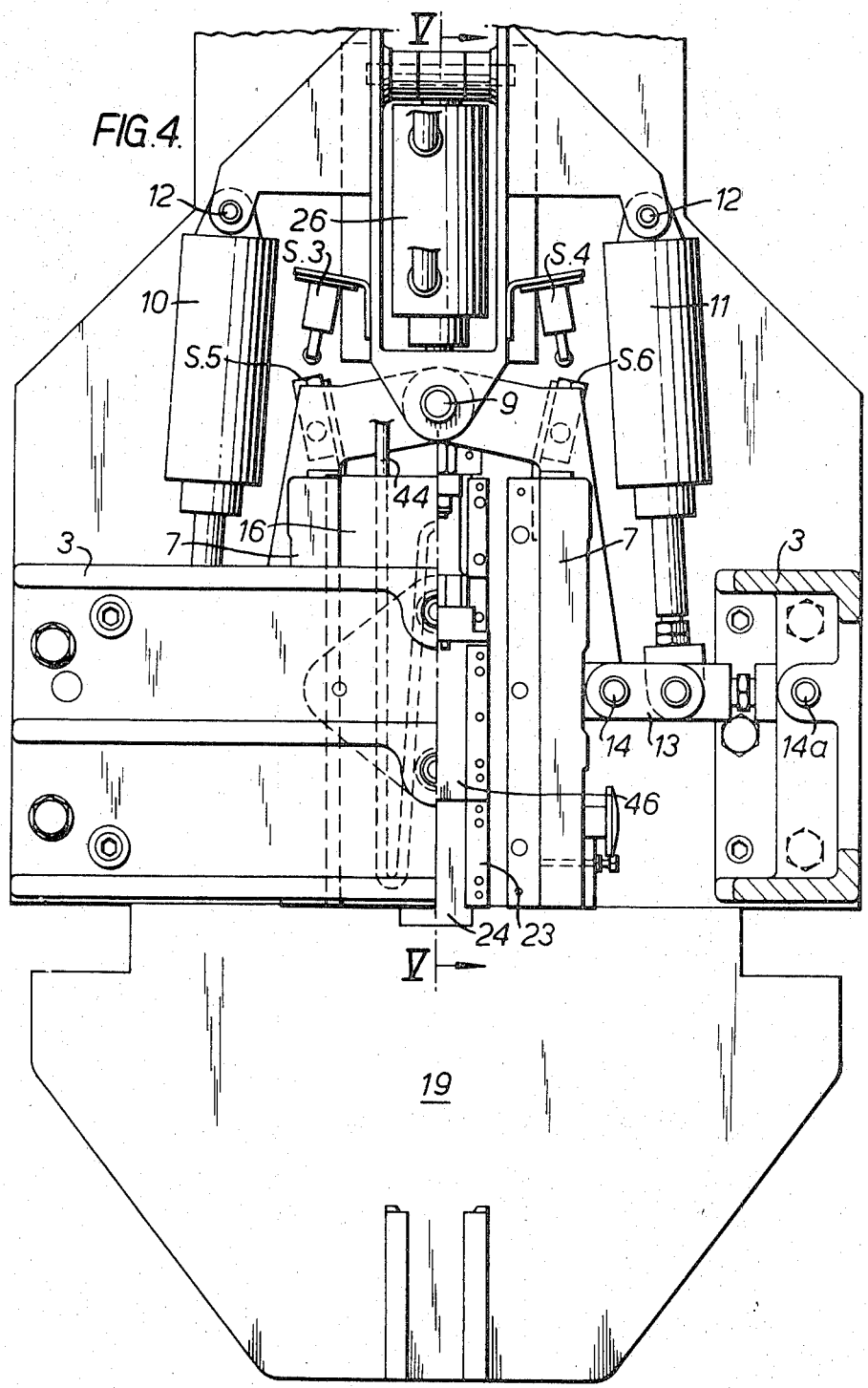
Figure 5:
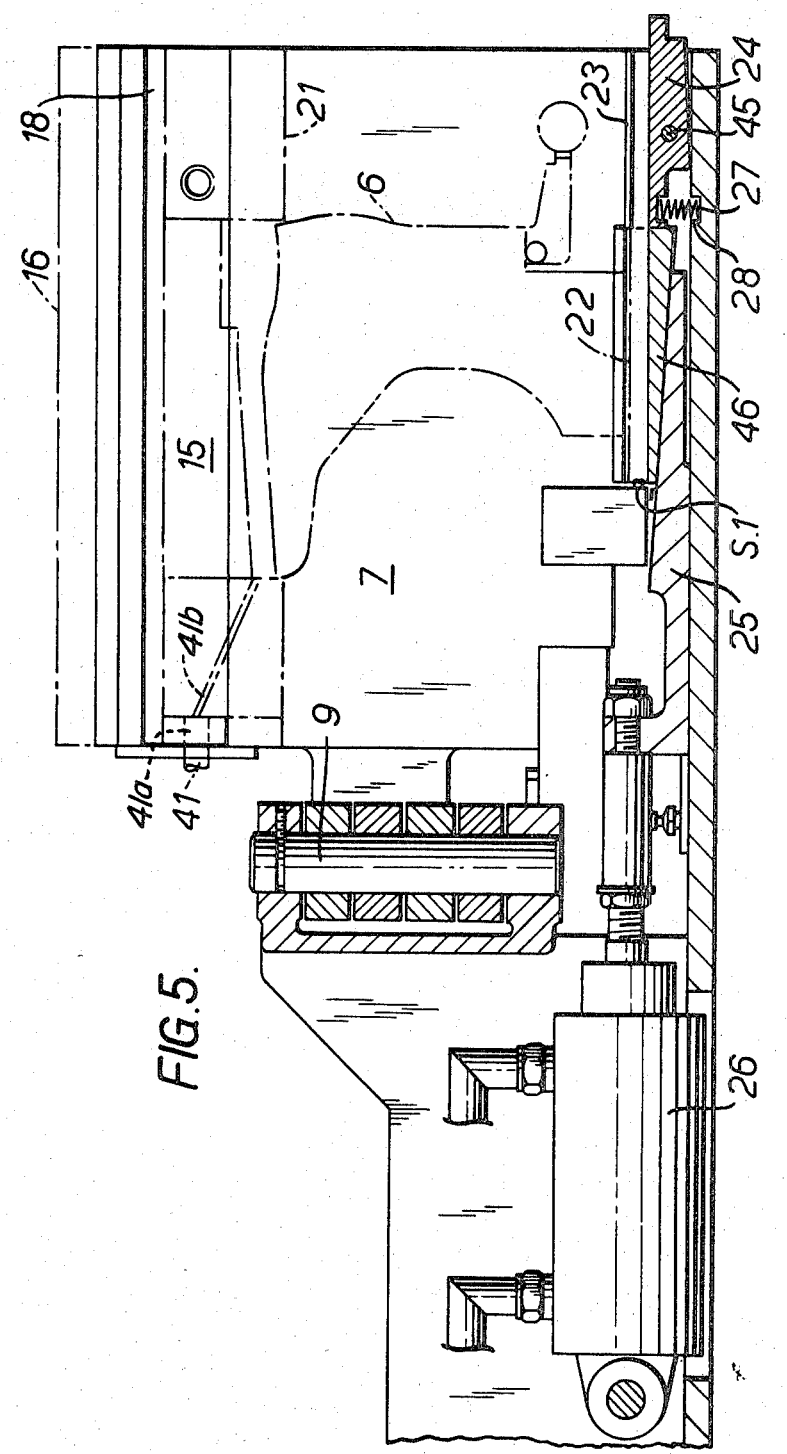
Figure 6:
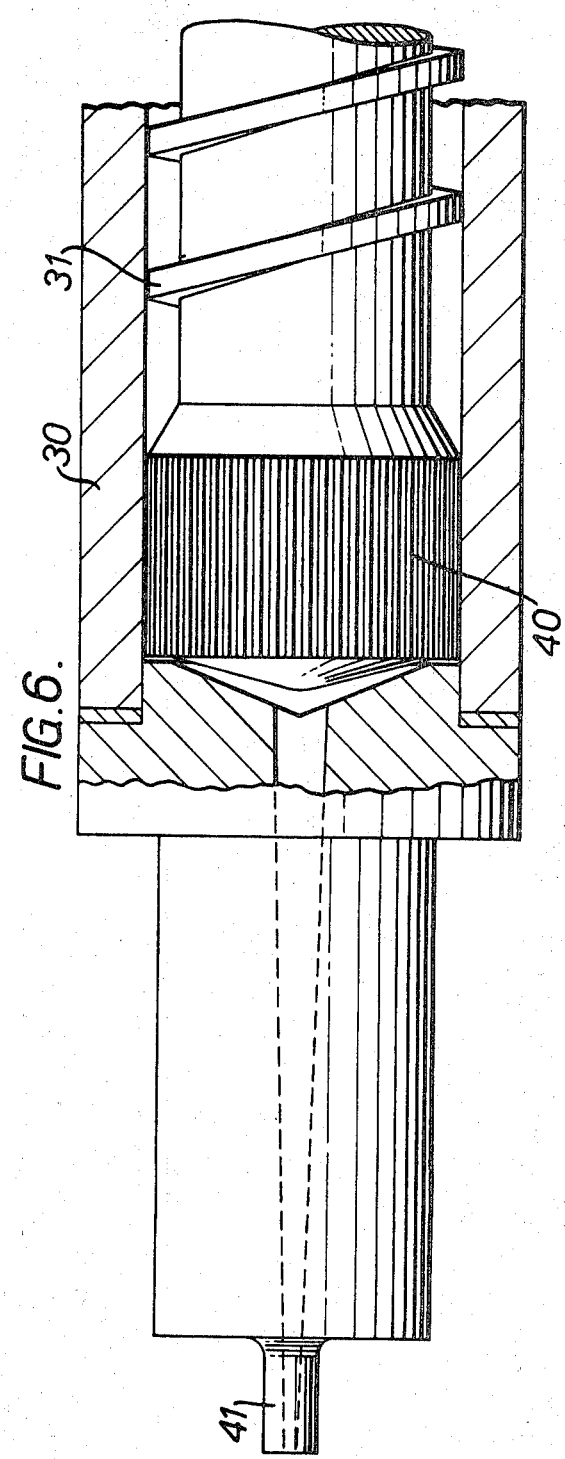
Figure 7:
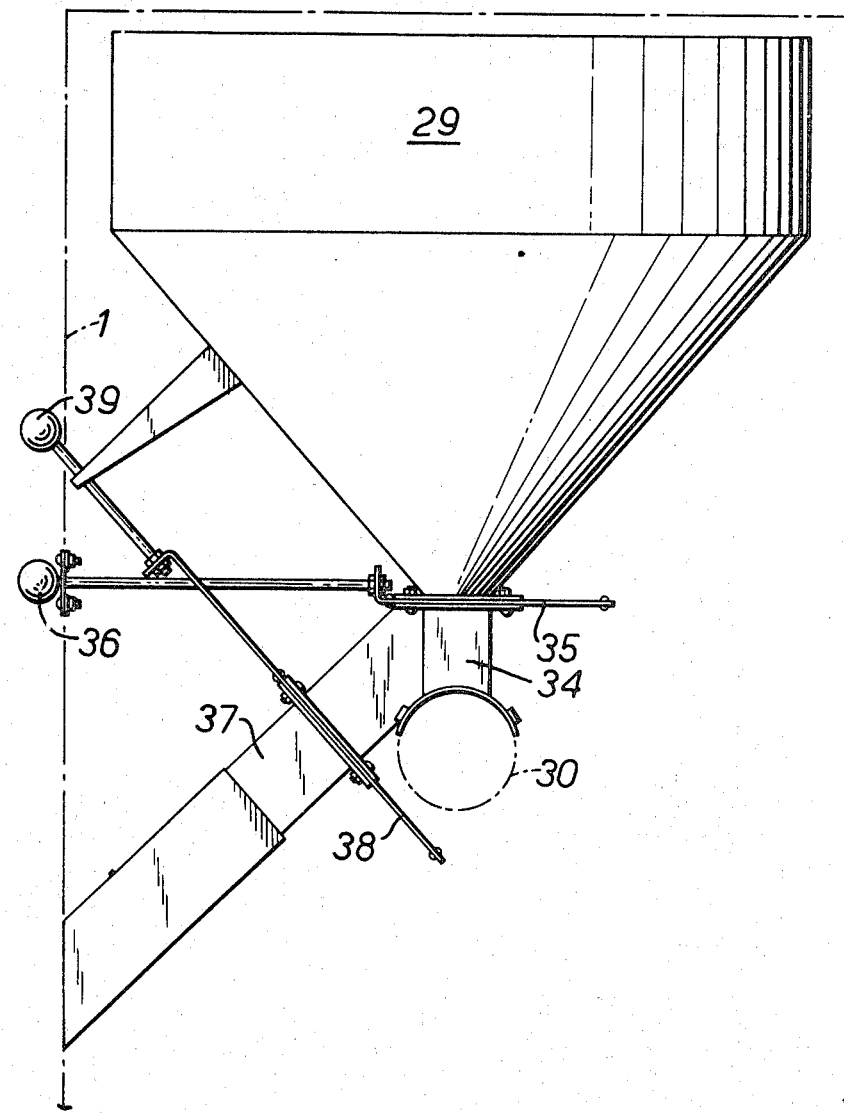
Figure 8:
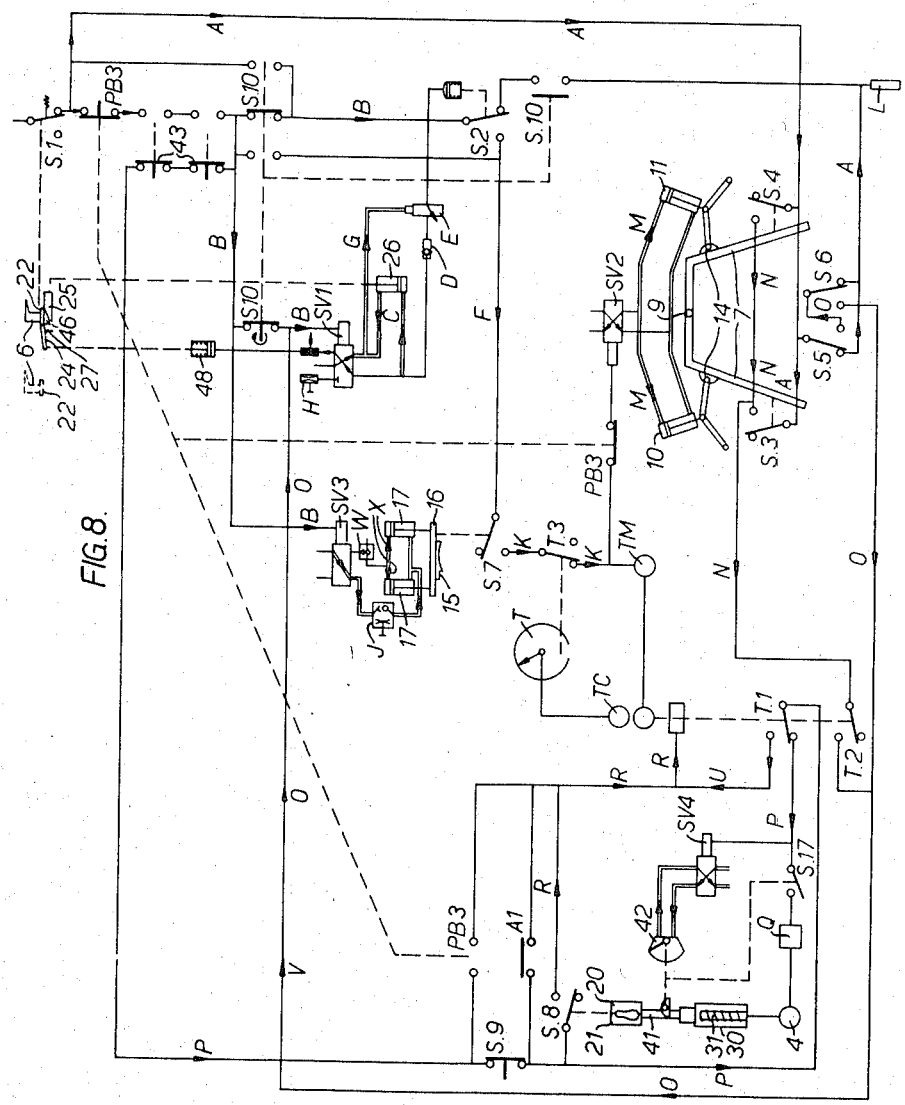

FIG. 3 is a part sectional view of the upper part of the machine showing the mould supporting components, and taken in the direction of the arrow III in FIG. 2, FIG. 4 is a plan view of the components shown in FIG. 3 partly in section, FIG. 5 is a detail view of the last entry platform taken on the line V—V of FIG. 4, FIG. 6 is a view on an enlarged scale of the injection nozzle and feed screw, FIG. 7 is an elevation of the feed hopper, and FIG. 8 is a diagram of the electrical circuit arrangement and compressed air conduits for controlling operation of the mechanisms illustrated in FIGS. 1–7.

The injection moulding machine illustrated is designed for applying soles and heels of plastics material to uppers of leather, fabric or other material and comprises a casing 1 (FIG. 1) in the base of which is disposed a frame or chassis 2 which supports a portal assembly 3 containing mould supporting and operating means. Within the chassis there are also disposed a driving motor 4 and a refrigerating unit 5 (FIG. 2).

The prepared shoe upper is mounted upon a last 6 in the conventional manner whereby the undersurface of the shoe provides one wall of the sole and heel forming cavity when the mould components are closed about the shoe upper. The lateral walls of the mould cavity are constituted by split side moulds 20 and 21 mounted on respective carriers 7 (FIGS. 3 and 4) movable about a pivot 9, their movement between open and closed positions being effected by fluid pressure operated double acting rams 10 and 11 pivotally mounted at 12 to fixed components of the machine framework and connected at their opposite ends to links 13 pivotally connected at 14 to the carriers and also to the portal members 3 at 14a.

The mould closing operation is effected by moving the side moulds on the carriers 7 into contact with each other and by moving a sole mould 15 on platen 16 downwards this operation being effected by fluid pressure operated double acting rams 17 (FIG. 3). These co-acting mould carrying members have inter-engageable flanged and rebated edge portions 18 adapted to interlock in the closed position in such manner that internal pressures are taken by the mould carrier structure and not by the mould operating mechanism.

The last is mounted upon a loading platform 19 and when the shoe upper has been positioned on it, the last is pushed into the machine and into the cavity provided between the opened sides mould carriers 7. A base plate 22 which carries the last is movable into the machine between guides 23 and onto a platform 24 as shown in FIG. 5, which is contiguous with a cradle 46 having an inclined undersurface. The entry of the base plate 22 causes the entry platform 24 to pivot downwards about pin 45. After the last has passed over the platform 24 a spring 27 in a recess 28 in the frame member returns platform 24 to its former position when it locks the last into the cradle 46 until it is removed at a later stage in the cycle of operations. The wedge 25 is actuated by a fluid pressure operated double acting ram 26 so raising the cradle 46 into the operative position.

The plastics material is contained in a hopper 29 (FIG. 7) disposed above a heated tubular casing 30 in which is rotatable mounted a feed screw 31 carrying a pulley 32 at its end which projects through the end of the casing 30, the said pulley being driven by a belt 33 from the motor 4. The hopper outlet 34 can be closed by a slidable valve member 35 provided with a handle 36 for manual operation. This valve can be opened to permit flow of material directly through the outlet 34 into the tubular casing 30 or moved to a position wherein the hopper can discharge into an outlet passage 37, this passage being provided to enable the hopper to be emptied for cleaning or for recharging with a material of a different character or colour. The outlet passage 37 is also provided with a shut-off valve 38 having a handle 39 for manual operation.

The feed screw 31 (FIG. 6) which conveys the plastics or other material through the tubular casing 30 to the mould cavity increases in root diameter towards its discharge end and terminates in a grooved cylindrical member 40 which ensures an even distribution of the material through an injector nozzle 41 which terminates the tubular casing 30 and communicates with the interior of the mould cavity. The mating faces of the split side moulds at that end nearer the pivot 9 are formed with cooperating grooves 41a (FIG. 5) which, when the side moulds are moved to the closed position embrace and make close contact with the injection nozzle 41 and with cooperating grooves 41b of smaller effective diameter which, when the side moulds are in the closed position, communicate between the end of the nozzle and the mould cavity.

Adjacent the nozzle 41 is a shut-off valve 42 which operates at the "mould-full" position to prevent leakage of the plastics material from the nozzle during the periods between the moulding operations.

Rapid gelling of the moulded units to maintain substantial rate of production is effected by causing at the appropriate stage in the cycle of operations, the passage of the coolant liquid under thermostatic control from the refrigerator 5 through a series of pipes 44 (FIG. 4) formed or disposed within the platen 16 attached to which by a quick release screw 8 is the upper member 15 of the mould cavity which is contoured on its undersurface to form the undersurfaces of the sole and heel.

The lower portion of the casing containing the refrigeration unit, the motor and the electrical controls is locked to prevent tampering and the operation of the machine is automatic after the last has entered the mould cavity. Operation of the machine is initiated by the operator pressing simultaneously on two buttons 43 (FIG. 1) disposed on the exterior of the lower part of the casing.

Air under pressure to operate the rams 10, 11, 17 and 26 can be obtained from any convenient source and a common compressor unit can be utilised to supply a number of moulding machines simultaneously.

The sequence of operations performed by the machine above described will next be described with reference to the diagram FIG. 8. In this figure the mechanical components of the machine shown diagrammatically are identified by the same reference numerals as used in FIGS. 1–7 but additional references in FIG. 8 are used to indicate the various components of the electrical and pneumatic circuits which come into operation successively during the moulding cycle.

The sequence of operations may be briefly summarised as follows:

(1) The last bearing the shoe upper is pushed by the operator into the mould cavity actuating a switch when the last reaches its operational position which illuminates an indicating light.
(2) The operator then uses both hands to press buttons 43 simultaneously to cause closure of the mould.
(3) The indicator light is extinguished when the mould is closed.
(4) When the buttons 43 are released by the operator injection of plastics material into the mould commences.
(5) Injection stops immediately the mould is full.
(6) Dwell time before the mould opens to release the moulded unit is controlled by a timing device.
(7) The mould next opens automatically.
(8) The operator withdraws the last with the completed shoe thereon.

The means for effecting this sequence of operations will now be described in detail with reference to FIG. 8.

In describing the sequence of operations of the machine illustrated in FIGS. 1–7 it will be assumed that compressed air and electricity are connected, the mould cavity open and the timer T set for the appropriate dwell to complete the moulding operation.

To commence the operations the last 6 bearing the shoe upper is pushed by the operator into the mould cavity actuating a switch S.1. When the last reaches its operation position the mould position indicator light L is illuminated. Power and air flow lines which are live at this stage are indicated by arrows A, the air flow trunks being represented by double lines.

The operator next presses upon the two "close mould" buttons 43 and electric power flows as indicated by arrows B. This energises solenoid valves SV1 and SV3. The operation of valve SV1 will cause compressed air to flow as indicated by arrows C to actuate the ram 26 and force the wedge 25 to raise the last 6. Compressed air also passes through valves D and E to the "last up" pressure switch S.2 which when operated allows electric current to pass to a "sole down" switch S.7 as indicated by arrow F. The valve D is of a non-return type to prevent the pressure switch from releasing when the compressed air system is disturbed by subsequent pneumatic operations. The switch S.2 is prevented from operating until just before the end of upward travel of the last 6 due to back pressure from the ram, as indicated by arrow G, holding valve E closed. The back pressure is developed due to restriction caused by valve H.

Referring now to solenoid valve SV3, air will flow as indicated by arrows X to cause the two rams 17 to lower the sole mould 15 on platen 16. An adjustable restrictor valve J prevents the sole platen being lowered too fast and so damaging the side moulds. The lowering of the sole platen operates the switch S.7 and power flows to the solenoid valve SV2 as indicated by arrows K and to a timer motor TM.

The energisation of solenoid valve SV2 causes compressed air flow to the side mould carrier rams as indicated by arrows M and when the side moulds move, switches S3 and S4 are released causing power flow as indicated by arrows N. When the side mould components reach the end of their inward travel switches S5 and S6 are operated causing power to flow as indicated by arrows O so removing power from the indicator lamp L. This indicates to the operator that the mould is closed and that the two buttons 43 can be released. A hold on circuit is provided as indicated by the arrows O to the electrical circuits made live when the buttons 43 were first pressed.

When the operator relaxes pressure on the buttons 43 power flows as indicated by arrows P which causes the solenoid valve SV4 to energise. This operation opens the nozzle shut-off valve 42 which in turn closes a switch S.17 so allowing power to a contactor coil Q which starts the motor 4 to operate the feed screw 31 and force plastics material into the mould.

When the mould is sufficiently full the material therein presses upon a small spring-loaded pin which operates a "mould-full" switch S.8 and causes power to flow as indicated by the arrows R. The timer clutch TC is now energised and immediately operates contacts T.1 and T.2 and engages the pointer drive. The contacts T.1 cause power to flow as indicated by arrows U and act as a hold on for the clutch coil when switch S.8 opens later should plastics shrinkage take place. The contacts T.2 connect lines O and N to ensure that the circuits previously held on by line O will now be held on until the side mould carriers 7 are fully out and switches S3 and S4 are pressed when the mould components open. The pointer of the timer T is now moving anti-clockwise away from the set time towards zero.

When the timer pointer reaches zero it operates contacts T.3 which cuts off power from the timer motor TM and solenoid valve SV2. The timer, therefore, stops and valve SV2 reverses the air flow to the side mould rams 10 and 11. As the side moulds move out switches S5 and S6 are released and the hold on path indicated by arrows O is removed as far as contact T.2.

When both side moulds are right out switches S3 and S4 are operated and the hold on path indicated by arrow V is also removed. The operation causes the timer clutch TC to release and the timer pointer and contacts T.1 and T.2 return to the off positions. Solenoid valves SV1 and SV3 are also de-energised when the hold on line V is removed, thus reversing the compressed air flow to the rams 10, 11, 17 and 26. Exhaust air issuing from valve SV1 is utilised to release the last by means of a spring return ram 48. The last with its moulded unit can be withdrawn from the machine. In order that the sole mould 15 mounted on platen 16 can move away very fast and so break cleanly from the sole pattern a quick exhaust valve indicated at W is provided and allows the rear of the sole rams 17 to exhaust almost directly to atmosphere and thus avoid any restriction due to pipes and valves.

The cycle of operations described is then repeated.

Provision is also made for certain operations not included in the normal cycle of operations:

In the event of it becoming necessary to stop operation of the machine at any stage of its use, the operator presses a button PB3 (FIG. 8) to cause interruption of the controls.

A switch S9 is also provided to enable the mould to be closed without injection taking place.

A time delay contact A1 is provided to ensure the injection of material being cut off should the switch operated by the "mould-full" condition fail to function.

It is to be understood that the embodiment of the invention described above with reference to the accompanying drawings is capable of modification and variation in its construction and mode of operation. For example, although the use of interlocking mould wall components has been described and illustrated, the platen supporting the sole mould component may, instead of interlocking with rebates on the side mould carriers, be adapted to reciprocate toward and away from the shoe upper after the side mould components are closed.

Alternatively, the sole mould component may be mounted on a member arranged to reciprocate toward and away from the shoe upper with respect to the sole platen.

The "top-seal" method of operation differs from the method above described only in the sequence of mould closure which can be altered by operating a switch S.10 (FIG. 8). In the "top-seal" method the switches and components controlled thereby are arranged to cause the following sequence of operations:

The last is entered, the operator closes the two switches 43, the sole platen descends, the side mould components then close against the interposed sole mould to form the sole/heel cavity and finally the last and shoe upper move vertically upwards to engage the periphery of the cavity thus formed, the prepared bottom of the shoe upper sealing against the side moulds.

What is claimed is:

1. A machine for injection moulding footwear or parts thereof comprising a casing, a frame mounted in the upper portion of said casing, a portal assembly supported on said frame, two side mould supporting members each mounted for movement about a common vertically extending pivot carried on said assembly, a platen for supporting a sole mould mounted in said assembly for vertical movement above said side mould supporting members, a rotary injection device mounted on said frame and having a fixed nozzle disposed adjacent said pivot, refrigerating means disposed in the lower portion of said casing and communicating with said platen, and a motor for driving said injection device also disposed in the lower portion of said casing.

2. A machine according to claim 1 including a side mould component releasably mounted on each said supporting member and a sole mould component releasably mounted on said platen, the mating faces of said side mould components nearer said pivot being formed with co-operating grooves defining in the "mould closed" position a recess for embracing and making close contact with said nozzle, and a passageway extending between said recess and the mould cavity.

3. A machine according to claim 2 including means for supporting a last below and in operative association with said side mould components.

4. A machine according to claim 3, including a wedge device for lifting the last into operative position and an electrically controlled fluid pressure ram for moving said wedge device.

5. A machine according to claim 2 including two electrically controlled fluid pressure operated rams each connected to a respective side mould supporting member for moving said members about said pivot.

6. A machinne according to claim 2 including an electrically controlled fluid pressure operated ram for moving said platen.

7. A machine according to claim 1 including means for supporting a last in operative position between said side mould supporting members, electrically controlled fluid pressure devices for moving said side mould supporting members and said platen between positions in which mould components carried thereon are in "mould open" and "mould closed" positions, and an electric control circuit, including a manually operable switch and a switch actuated by movement of the last into operative position, effective when completed by actuation of both switches to energize said fluid pressure devices to move the mould components into "mould closed" position.

8. A machine according to claim 7 including means for energizing the driving motor for said injection device when said control circuit is completed.

9. A machine according to claim 7, including a timing device for determining the time interval during which the mould components remain in "mould closed" position.

10. A machine according to claim 7 wherein the control circuit includes means providing a visual signal indicating that the last is in operative position and that the manually operable switch may be actuated to initiate the sequence of operations.

References Cited

UNITED STATES PATENTS

| | | | |
|---|---|---|---|
| 2,111,857 | 3/1938 | Jeffery | 18—(30LAUX) |
| 2,885,734 | 5/1959 | Wucher | 18—30(NVA) |
| 3,014,242 | 12/1961 | Baker et al. | 18—(30USUX) |
| 3,110,061 | 11/1963 | Hardy | 18—30(US) |
| 3,131,430 | 5/1964 | Rodenacker | 18—(30CSUX) |
| 3,153,814 | 10/1964 | Ohrnberger | 18—30(HN) |
| 3,299,476 | 1/1967 | McIlvin | 18—30(CR) |
| 3,339,236 | 9/1967 | Battell et al. | 18—30(US)X |
| 3,425,095 | 2/1969 | Kotek | 18—30(US) |
| 2,903,740 | 9/1959 | Parfrey | 18—(5BHUX) |
| 3,294,883 | 12/1966 | Polka | 18—5(BH)X |

FOREIGN PATENTS

| | | | |
|---|---|---|---|
| 1,488,132 | 5/1967 | France | 18—30(LA) |

J. SPENCER OVERHOLSER, Primary Examiner

M. O. SUTTON, Assistant Examiner

U.S. Cl. X.R.

18—34